(12) United States Patent
Hasegawa et al.

(10) Patent No.: US 12,503,010 B2
(45) Date of Patent: Dec. 23, 2025

(54) SENSOR-EQUIPPED SEAT

(71) Applicant: Sumitomo Riko Company Limited, Aichi (JP)

(72) Inventors: Koichi Hasegawa, Aichi (JP); Hirokazu Yamamoto, Aichi (JP); Masaru Murayama, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 134 days.

(21) Appl. No.: 18/629,943

(22) Filed: Apr. 9, 2024

(65) Prior Publication Data

US 2024/0270123 A1    Aug. 15, 2024

Related U.S. Application Data

(63) Continuation of application No. PCT/JP2022/036634, filed on Sep. 30, 2022.

(30) Foreign Application Priority Data

Mar. 4, 2022   (JP) ................................. 2022-033078

(51) Int. Cl.
*B60N 2/00*   (2006.01)
*A61B 5/00*   (2006.01)
*A61B 5/0205*   (2006.01)

(52) U.S. Cl.
CPC ......... *B60N 2/0022* (2023.08); *B60N 2/0033* (2023.08); *A61B 5/0205* (2013.01); *A61B 5/6891* (2013.01)

(58) Field of Classification Search
CPC .... B60N 2/0022; B60N 2/0033; B60N 2/002; B60N 2/7094; B60N 2/90; A61B 5/0205;

(Continued)

(56) References Cited

U.S. PATENT DOCUMENTS

2007/0132559 A1*   6/2007   Schleeh ............ B60R 21/01532
                                                340/425.5
2010/0295563 A1*   11/2010   Bieck .................. B60N 2/0025
                                                324/679
2024/0278698 A1*   8/2024   Mizoi ...................... A47C 7/02

FOREIGN PATENT DOCUMENTS

JP   5887875   3/2016
JP   5974757   8/2016
JP   6409466   10/2018

OTHER PUBLICATIONS

"International Search Report (Form PCT/ISA/210) of PCT/JP2022/036634", mailed on Nov. 29, 2022, with English translation thereof, pp. 1-4.

* cited by examiner

*Primary Examiner* — Valentina Xavier
(74) *Attorney, Agent, or Firm* — JCIPRNET

(57) ABSTRACT

A sensor-equipped seat includes: a sensor device, disposed between a seat frame and an opposite pressure receiving surface of a seat cushion; and an elastic support member, interposed between the seat frame and the sensor device and elastically supporting the sensor device. The sensor device includes: a sensor body, having a detection surface; and a housing, accommodating the sensor body, including a window frame for forming a window opening, exposing the detection surface of the sensor body at the window opening, and supported by the elastic support member. The elastic support member has an elastic modulus set equal to or greater than an elastic modulus of the seat cushion.

16 Claims, 6 Drawing Sheets

(58) Field of Classification Search
CPC ..... A61B 5/6891; A61B 5/024; A61B 5/1036; A61B 5/1116; A61B 5/6893; A61B 5/113
See application file for complete search history.

SENSOR-EQUIPPED SEAT

CROSS-REFERENCE TO RELATED APPLICATION

This application is a continuation of PCT International Application No. PCT/JP2022/036634, filed on Sep. 30, 2022, which claims priority under 35 U.S.C § 119(a) to Japanese Patent Application No. 2022-033078, filed on Mar. 4, 2022. Each of the above application(s) is hereby expressly incorporated by reference, in its entirety, into the present application.

BACKGROUND

Technical Field

The present disclosure relates to a sensor-equipped seat.

Related Art

Japanese Patent No. 6409466 (hereinafter Patent Document 1) and Japanese Patent No. 5887875 (hereinafter Patent Document 2) describe configurations in which a sensor is disposed on a seat, and a seating state (such as seating posture) or biological information (such as breathing, pulsation, and heartbeat) of a seated person is acquired. In Patent Document 1, a sensor is disposed sandwiched between a seat frame and a seat cushion. This sensor, for example, emits electromagnetic waves upward (toward the seated person who is seated) at a predetermined irradiation angle relative to a horizontal direction, receives and detects reflected waves thereof, thereby detecting body surface displacement that occurs with the pulsation or breathing of the seated person. In Patent Document 2, a piezoelectric sensor for detection is disposed in a seat cushion. A convex part is provided on the seat cushion, and this convex part is configured to press the piezoelectric sensor.

Japanese Patent No. 5974757 (hereinafter Patent Document 3) describes a seating sensor. The seating sensor is disposed within the seat cushion. An upper portion of the seating sensor is composed of a foamed resin body, and a lower portion of the seating sensor is composed of a highly elastic body having a greater elastic modulus than the foamed resin body.

In the case where a sensor that detects pressure, such as a piezoelectric sensor or an electrostatic sensor, is installed on a seat to acquire a seating state or biological information of a seated person, it is desired that the sensor detect pressure with high accuracy. In Patent Documents 2 and 3, since the sensor is caught in by the seat cushion, the sensor is not fixed. Hence, the sensor may change position, the pressure input to the sensor may be dispersed, and the sensor is unable to detect the pressure with high accuracy.

SUMMARY

One aspect of the present disclosure provides a sensor-equipped seat including a seat body, a sensor device, and an elastic support member. The seat body includes a seat frame and a seat cushion that is attached to the seat frame. The sensor device is disposed between the seat frame and an opposite pressure receiving surface that is located on a back side of a pressure receiving surface receiving pressure from a seated person in the seat cushion. The sensor device detects a physical quantity corresponding to pressure transmitted via the seat cushion from the pressure receiving surface of the seat cushion in a seating state by the seated person, thereby detecting the seating state of the seated person or biological information of the seated person. The elastic support member is interposed between the seat frame and the sensor device, and elastically supports the sensor device. The sensor device includes: a sensor body, including a detection surface receiving pressure from the opposite pressure receiving surface of the seat cushion; and a housing, accommodating the sensor body, including a window frame for forming a window opening, exposing the detection surface of the sensor body at the window opening, and supported by the elastic support member. The elastic support member has an elastic modulus set equal to or greater than an elastic modulus of the seat cushion.

DESCRIPTION OF THE EMBODIMENTS

Figure 1:
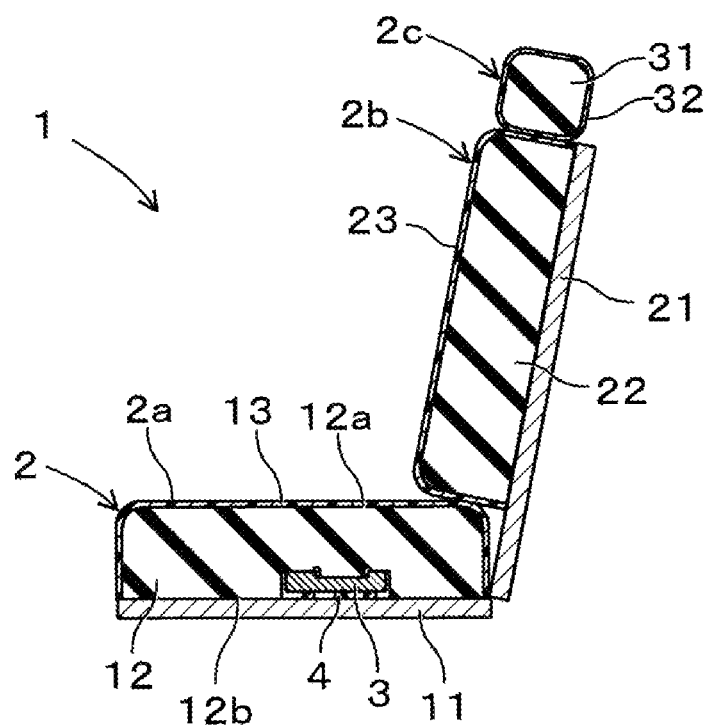
FIG. 1 is a cross-sectional view of a sensor-equipped seat of Embodiment 1.

The present disclosure provides a sensor-equipped seat that is able to detect, with high accuracy, a seating state or biological information of a seated person.

According to the sensor-equipped seat described above, a sensor device includes a housing, and a sensor body is accommodated in the housing. Accordingly, the sensor body accommodated in the housing can be stably positioned within the housing.

The sensor device is disposed between a seat frame and an opposite pressure receiving surface of a seat cushion. The housing of the sensor device includes a window frame for forming a window opening, and a detection surface of the sensor body is exposed at the window opening. By the detection surface of the sensor body receiving pressure from the opposite pressure receiving surface of the seat cushion, the sensor device detects a seating state or biological information of a seated person.

However, when vibration of the seat frame is transmitted to the sensor body via the housing, there is a possibility that a detection result of the sensor body may include noise, and detection cannot be performed with high accuracy. Accordingly, the housing of the sensor device is elastically supported by the seat frame via an elastic support member. Accordingly, the vibration of the seat frame can be prevented from being directly transmitted to the housing of the sensor device, and the sensor body can be prevented from being affected by the vibration of the seat frame.

In particular, the elastic support member has an elastic modulus set equal to or greater than an elastic modulus of the seat cushion. Accordingly, by the elastic support member, while the vibration from the seat frame can be prevented from being transmitted to the housing of the sensor device, the detection surface of the sensor body is able to reliably receive pressure from the seated person via the seat cushion. Accordingly, the seating state or biological information of the seated person can be detected with high accuracy.

As described above, according to the above aspect, a sensor-equipped seat can be provided that is able to detect the seating state or biological information of the seated person with high accuracy. The reference numerals in parentheses in the claims indicate the correspondence with specific means described in the embodiments described later, and do not limit the technical scope of the disclosure.

Embodiment 1

1. Overall Configuration of Sensor-Equipped Seat 1

An overall configuration of a sensor-equipped seat 1 is described with reference to FIG. 1. The sensor-equipped seat 1 is applied to, for example, a seat for vehicles such as automobiles or railway vehicles, or a seat for medical examination. The sensor-equipped seat 1 is used to detect a seating state of a seated person or biological information of the seated person. The seating state of the seated person to be detected includes, for example, a seating posture, or a change in the seating posture. The biological information of the seated person to be detected includes, for example, breathing, pulsation, or heartbeat of the seated person.

For example, if the sensor-equipped seat 1 is applied to a driver's seat among the seats for vehicles, the sensor-equipped seat 1 may be used to detect a seating state by a driver during driving or biological information of the driver.

As shown in FIG. 1, the sensor-equipped seat 1 includes a seat body 2, a sensor device 3, and an elastic support member 4. The seat body 2 is a main member that constitutes the seat. The seat body 2 includes a seat seating surface part 2a, a seat back part 2b, and a headrest 2c. However, the seat body 2 may be composed only of the seat seating surface part 2a, or may be composed only of the seat seating surface part 2a and the seat back part 2b.

The seat seating surface part 2a includes a seating surface seat frame 11, a seating surface seat cushion 12, and a seating surface skin member 13. The seating surface seat frame 11, for example, is made of a hard material such as metal or hard resin, and is attached to an installation surface. The seating surface seat frame 11 is formed in a plate shape, a rod shape, or the like.

The seating surface seat cushion 12 is made of an elastic material such as foamed resin. The seating surface seat cushion 12 is laminated and attached to an upper surface of the seating surface seat frame 11. An upper surface of the seating surface seat cushion 12 serves as a surface (pressure receiving surface) 12a that receives pressure from the buttocks of the seated person. That is, a lower surface of the seating surface seat cushion 12, that is, an opposite pressure receiving surface 12b which is a surface on the back side of the pressure receiving surface 12a, faces the seating surface seat frame 11. The seating surface skin member 13 covers the seating surface seat cushion 12. The seating surface skin member 13 covers at least the pressure receiving surface 12a of the seating surface seat cushion 12. The seating surface skin member 13 is made of a material such as cloth or leather.

The seat back part 2b includes a back surface seat frame 21, a back surface seat cushion 22, and a back surface skin member 23. The back surface seat frame 21, for example, is made of a hard material such as metal or hard resin. The back surface seat frame 21 is formed in a plate shape, a rod shape, or the like. For example, if the seat body 2 is provided with a reclining function, the back surface seat frame 21 is swingably supported by the seating surface seat frame 11. Of course, the back surface seat frame 21 may be integrally fixed to the seating surface seat frame 11.

The back surface seat cushion 22 is made of an elastic material such as foamed resin. The back surface seat cushion 22 is laminated and attached to a front surface of the back surface seat frame 21. A front surface of the back surface seat cushion 22 serves as a surface (pressure receiving surface) that receives pressure from the back of the seated person. That is, an opposite pressure receiving surface which is a rear surface of the back surface seat cushion 22 faces the back surface seat frame 21. The back surface skin member 23 covers the back surface seat cushion 22. The back surface skin member 23 covers at least the pressure receiving surface of the back surface seat cushion 22. The back surface skin member 23 is made of a material such as cloth or leather.

The headrest 2c is disposed at an upper end of the seat back part 2b. The headrest 2c includes a cushion 31 and a skin member 32. Here, the seat seating surface part 2a and the seat back part 2b are shown as separate bodies in FIG. 1. However, the seat seating surface part 2a and the seat back part 2b may be integrated. The seat back part 2b and the headrest 2c are shown as separate bodies, but may be integrated.

The sensor device 3 is disposed between the seating surface seat frame 11 and the opposite pressure receiving surface 12b of the seating surface seat cushion 12. Here, since the seated person is seated on the seat body 2, pressure is applied from the buttocks of the seated person to the pressure receiving surface 12a of the seating surface seat cushion 12, the pressure is transmitted via the seating surface seat cushion 12 to the opposite pressure receiving surface 12b of the seating surface seat cushion 12. The sensor device 3 receives pressure from the opposite pressure receiving surface 12b of the seating surface seat cushion 12. That is, in a seating state by the seated person, the sensor device 3 detects a physical quantity corresponding to pressure transmitted via the seating surface seat cushion 12 from the pressure receiving surface 12a of the seating surface seat cushion 12. The sensor device 3 detects the seating state of the seated person or biological information of the seated person based on the detected physical quantity.

The elastic support member 4 is interposed between the seating surface seat frame 11 and the sensor device 3, and elastically supports the sensor device 3. In the present embodiment, a lower surface of the sensor device 3 is elastically supported by a plurality of elastic support members 4. From the viewpoint of stable support, the number of elastic support members 4 is preferably, for example, three or more. The elastic support member 4 is made of a rubber elastic body or an elastomer. Furthermore, the elastic support member 4 has an elastic modulus set equal to or greater than an elastic modulus of the seating surface seat cushion 12.

Here, the sensor device 3 is disposed in the seat seating surface part 2a, but may be disposed in the seat back part 2b. In this case, the sensor device 3 is disposed between the back surface seat frame 21 and the back surface seat cushion 22. In the seating state by the seated person, the sensor device 3 detects a physical quantity corresponding to pressure transmitted via the back surface seat cushion 22 from the pressure receiving surface of the back surface seat cushion 22. Then, the sensor device 3 is able to detect the seating state of the seated person or biological information of the seated person based on the detected physical quantity.

2. Configuration of Sensor Device 3 and Elastic Support Member 4

Figure 2:
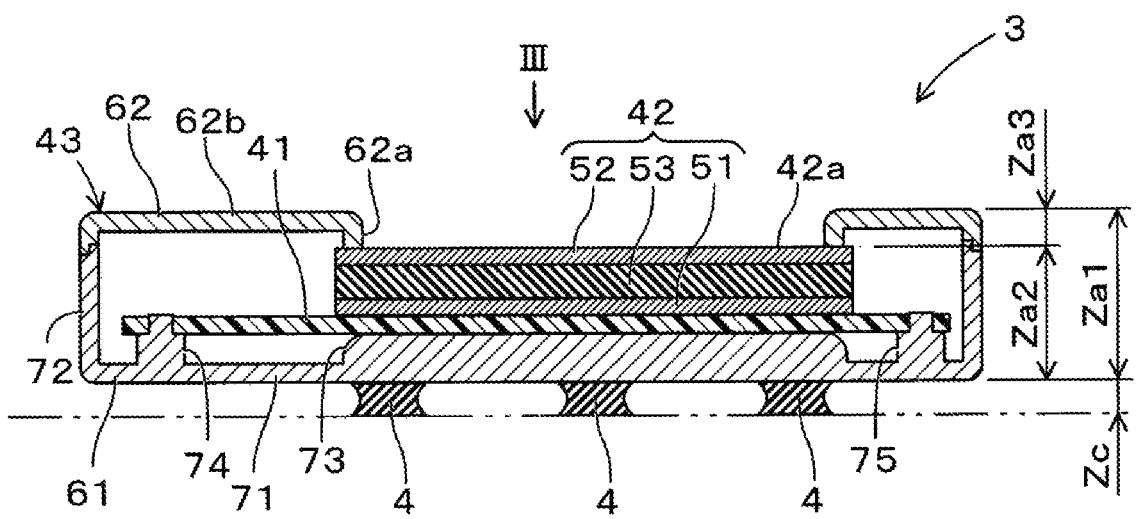
FIG. 2 is a cross-sectional view of a sensor device that constitutes the sensor-equipped seat.
Figure 3:
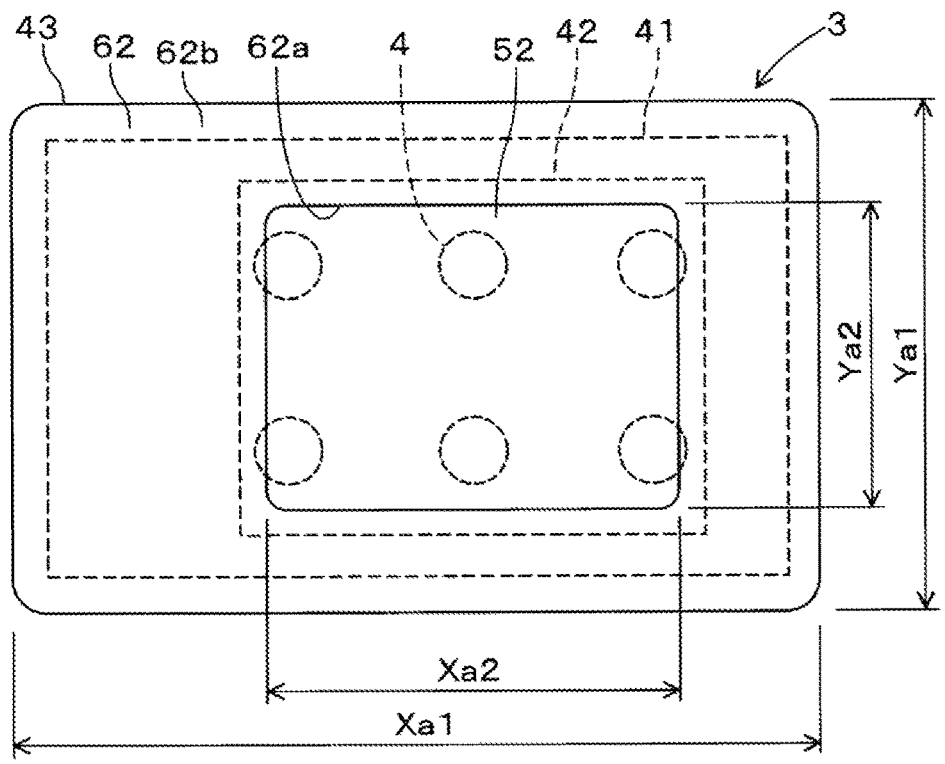
FIG. 3 is a top view of the sensor device as viewed in direction III in FIG. 2.

A configuration of the sensor device 3 and the elastic support member 4 is described with reference to FIG. 2 and FIG. 3. FIG. 2 and FIG. 3 show the sensor device 3 and the elastic support member 4 before being assembled to the seat body 2.

The sensor device 3 includes a substrate 41, a sensor body 42, and a housing 43. The substrate 41 is a plate member for forming an electronic circuit. The substrate 41 has the electronic circuit formed thereon and has a plurality of holes for positioning formed therein.

The sensor body 42 is composed of a piezoelectric sensor or an electrostatic sensor. In the present embodiment, the sensor body 42 is formed in a sheet shape (film shape). The sensor body 42 is compressively deformed by receiving the pressure from the opposite pressure receiving surface 12b of the seating surface seat cushion 12, and is thereby able to output a physical quantity corresponding to the received pressure. The sensor body 42 is disposed on one surface (upper surface in FIG. 2) of the substrate 41. In the present embodiment, the sensor body 42 is disposed near the center of the substrate 41.

If the sensor body 42 is a piezoelectric sensor, the sensor body 42 includes a first electrode layer 51, a second electrode layer 52, and an intermediate layer 53 made of a piezoelectric material. The first electrode layer 51, the intermediate layer 53, and the second electrode layer 52 are laminated in this order.

The first electrode layer 51 is disposed in contact with the substrate 41. The second electrode layer 52 is disposed at a distance from a surface of the first electrode layer 51 opposite to the substrate 41. The first electrode layer 51 and the second electrode layer 52 may each be composed of one conductive sheet.

One of the first electrode layer 51 and the second electrode layer 52 may be composed of one conductive sheet, and the other may be composed of a plurality of conductive sheets arranged apart from each other. Furthermore, the first electrode layer 51 and the second electrode layer 52 may each be composed of a plurality of conductive sheets. For example, opposing positions of the plurality of conductive sheets constituting the first electrode layer 51 and the plurality of conductive sheets constituting the second electrode layer 52 may be arranged in one row or may be arranged in a matrix.

In the case where the sensor body 42 is a piezoelectric sensor, the intermediate layer 53 is made of a piezoelectric material and is sandwiched between the first electrode layer 51 and the second electrode layer 52. In the case where compressive force is applied in a lamination direction of the members 51, 52 and 53 that constitute the sensor body 42, the intermediate layer 53 generates electric power corresponding to the compressive force. Accordingly, if the sensor body 42 is a piezoelectric sensor, the sensor device 3 detects, for example, the electric power corresponding to the compressive force, as the physical quantity described above.

If the sensor body 42 is an electrostatic sensor, the sensor body 42 includes the first electrode layer 51, the second electrode layer 52, and the intermediate layer 53 made of a dielectric material. As in the case where the sensor body 42 is a piezoelectric sensor, the first electrode layer 51, the intermediate layer 53, and the second electrode layer 52 are laminated in this order. The first electrode layer 51 and the second electrode layer 52 are configured in the same manner as in the case where the sensor body 42 is a piezoelectric sensor.

In the case where the sensor body 42 is an electrostatic sensor, the intermediate layer 53 is made of an elastically deformable dielectric material and is sandwiched between the first electrode layer 51 and the second electrode layer 52. In the case where compressive force is applied in the lamination direction of the members 51, 52 and 53 that constitute the sensor body 42, the intermediate layer 53 reduces a separation distance between the first electrode layer 51 and the second electrode layer 52, thereby changing capacitance between the first electrode layer 51 and the second electrode layer 52. Accordingly, if the sensor body 42 is an electrostatic sensor, the sensor device 3 detects, for example, a change in capacitance corresponding to the compressive force, as the physical quantity described above.

The sensor body 42 includes a detection surface 42a that receives the pressure from the opposite pressure receiving surface 12b of the seating surface seat cushion 12. Accordingly, the detection surface 42a is exposed toward the seating surface seat cushion 12. In the present embodiment, the detection surface 42a is a surface of the second electrode layer 52 and is a surface opposite to the intermediate layer 53.

The housing 43 constitutes an outer case portion of the sensor device 3. The housing 43 accommodates the substrate 41 and the sensor body 42. In the present embodiment, the housing 43 includes a first housing member 61 and a second housing member 62. The first housing member 61 is formed in a container shape, and the second housing member 62 is formed in a lid shape. However, a boundary position between the first housing member 61 and the second housing member 62 can be arbitrarily set. The first housing member 61 and the second housing member 62 may be formed in an integral shape.

As described above, the first housing member 61 is formed in a container shape. The first housing member 61 includes a bottom 71, a peripheral wall 72, a sensor seat 73, and positioning pins 74 and 75. A case where the bottom 71 is formed in, for example, a rectangular flat plate shape, is described as an example. However, the bottom 71 may be of any shape. The peripheral wall 72 is erected from a periphery of the bottom 71 and is provided over the entire periphery of the bottom 71. In the present embodiment, the peripheral wall 72 constitutes four circumferentially adjacent sides of a rectangular parallelepiped. The substrate 41 and the sensor body 42 are accommodated in an internal region formed by the bottom 71 and the peripheral wall 72 of the first housing member 61.

The sensor seat 73 is provided to protrude upward from an inner surface (upper surface in FIG. 2) of the bottom 71. The sensor seat 73 has a seating surface of approximately the same size as the sensor body 42. The substrate 41 is disposed on and in contact with a convex surface of the sensor seat 73.

In particular, the sensor seat 73 contacts a region of the substrate 41 where the sensor body 42 is located. That is, the convex surface of the sensor seat 73 and the sensor body 42 have a positional relationship in which they face each other with the substrate 41 interposed therebetween.

The positioning pins 74 and 75 are provided to protrude upward from the inner surface of the bottom 71 and are provided around the sensor seat 73. The positioning pins 74 and 75 support the substrate 41 from below and are inserted into the holes for positioning that are formed in the substrate 41, thereby positioning the substrate 41.

As described above, the second housing member 62 is formed in a lid shape. The second housing member 62 partially closes an opening of the first housing member 61. That is, an outer periphery of the second housing member 62 is joined to the peripheral wall 72 of the first housing member 61. Furthermore, the second housing member 62 has a window opening 62a near the center. That is, the second housing member 62 constitutes a window frame 62b for forming the window opening 62a. In the present embodiment, the window opening 62a is a rectangular opening, and the window frame 62b is a rectangular frame.

The window opening 62a of the second housing member 62 corresponds to the position of the sensor body 42. That is, the second housing member 62 exposes the detection surface 42a of the sensor body 42 at the window opening 62a. An inner periphery of the window frame 62b constituting the second housing member 62 contacts while being slightly pressed against an outer periphery of the sensor body 42. That is, the outer periphery of the sensor body 42 is sandwiched between the substrate 41 and the inner periphery of the window frame 62b constituting the second housing member 62. In this way, the sensor body 42 is positioned.

A plurality of (for example, six) elastic support members 4 are disposed on a lower surface of the housing 43. That is, the plurality of elastic support members 4 are disposed on an outer surface of the bottom 71 of the first housing member 61. In the present embodiment, the plurality of elastic support members 4 are disposed in a region of the outer surface of the first housing member 61 that corresponds to the sensor seat 73. Accordingly, the plurality of elastic support members 4 elastically support, in particular, the region of the first housing member 61 where the sensor body 42 is disposed. However, in addition to the region corresponding to the sensor seat 73, the plurality of elastic support members 4 may be disposed in a region corresponding to an area around the sensor seat 73.

Various dimensions of the sensor device 3 and the elastic support member 4 are described with reference to FIG. 2 and FIG. 3. The sensor device 3 is formed in a flat shape as a whole. Furthermore, the sensor device 3 is formed in a shape approximating a rectangular parallelepiped. The sensor device 3 has an outer shape in which a flat height is $Za1$, a width is $Xa1$, and a depth is $Ya1$. Since the sensor device 3 is of a flat shape, the flat height $Za1$ is smaller than the width $Xa1$ and the depth $Ya1$.

As shown in FIG. 2, in the sensor device 3, a distance from the outer surface of the bottom 71 of the first housing member 61 to the detection surface 42a of the sensor body 42 is $Za2$. A distance from an outer surface (surface opposite to the bottom 71) of the window frame 62b constituting the second housing member 62 to the detection surface 42a of the sensor body 42 is $Za3$. That is, a value obtained by adding $Za2$ and $Za3$ is $Za1$.

As shown in FIG. 3, an opening size of the window opening 62a includes a width $Xa2$ and a depth $Ya2$. As shown in FIG. 2, an opening height of the window opening 62a, that is, a height of an inner peripheral surface of the window frame 62b, is $Za3$.

As shown in FIG. 2, the elastic support member 4 has a height $Zc$. The height $Zc$ of the elastic support member 4 is the height of the elastic support member 4 in a state of being compressively deformed by the dead weight of the sensor device 3 since the sensor device 3 is carried on an upper surface of the elastic support member 4. In this state, the total height of the sensor device 3 and the elastic support member 4 is "$Za1+Zc$." As shown in FIG. 3, as viewed from above, the plurality of elastic support members 4 are disposed inside an outer peripheral surface of the housing 43, more specifically, inside the outer shape of the sensor body 42.

3. Configuration of Seating Surface Seat Cushion 12

Figure 4:
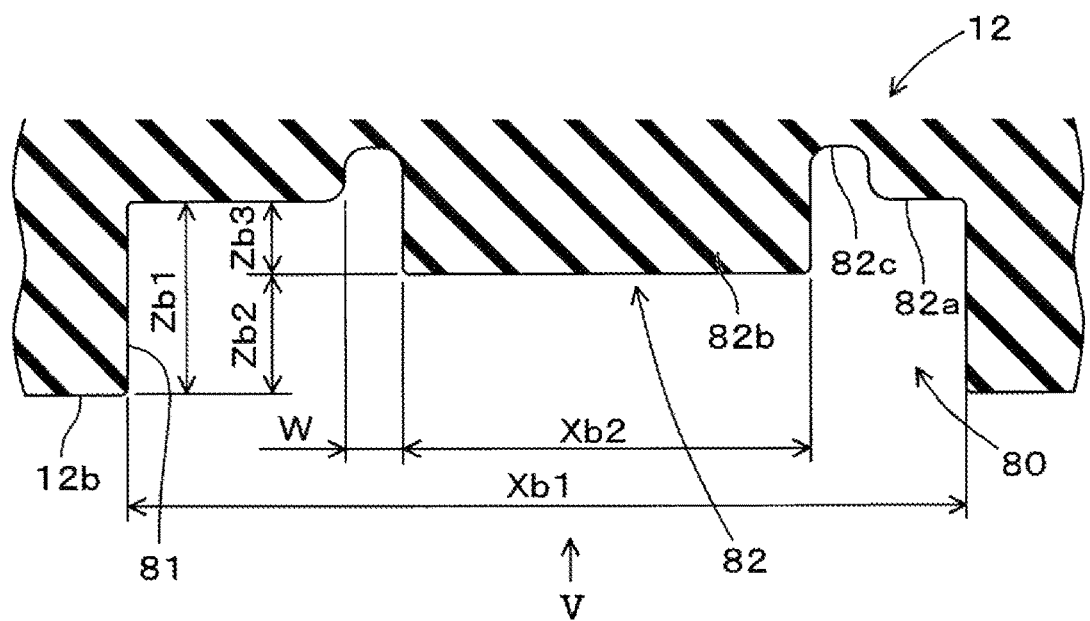
FIG. 4 is a partial cross-sectional view of a seating surface seat cushion that constitutes the sensor-equipped seat.
Figure 5:
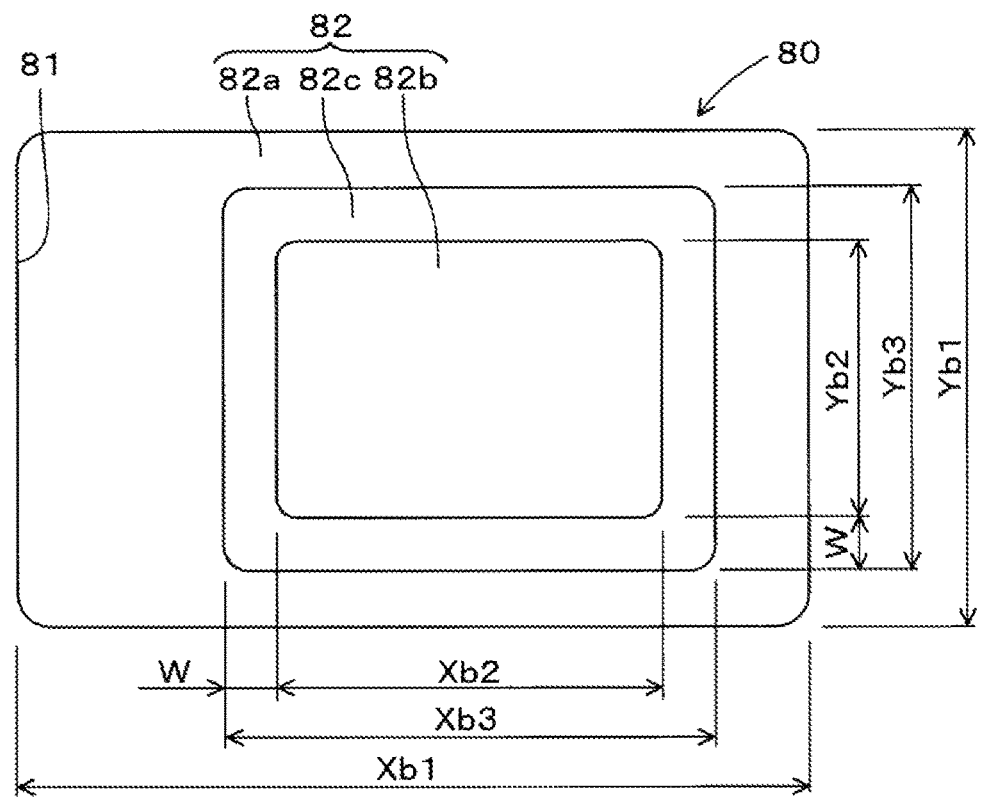
FIG. 5 is a bottom view of an accommodation recess portion of the seating surface seat cushion as viewed in direction V in FIG. 4.

A configuration of the seating surface seat cushion 12 is described with reference to FIG. 4 and FIG. 5. FIG. 4 and FIG. 5 show the seating surface seat cushion 12 alone, that is, the seating surface seat cushion 12 before the sensor device 3 is assembled thereto.

The seating surface seat cushion 12 includes an accommodation recess 80 formed in the opposite pressure receiving surface 12b. The accommodation recess 80 opens on a side opposite to the pressure receiving surface 12a of the seating surface seat cushion 12, that is, on the seating surface seat frame 11 side. The accommodation recess 80 accommodates the sensor device 3.

As shown in FIG. 5, the accommodation recess 80 has a rectangular opening. That is, an inner peripheral wall 81 of the accommodation recess 80 is formed in a rectangular shape. The inner peripheral wall 81 is formed in a shape corresponding to a shape of the outer peripheral surface of the sensor device 3. That is, the inner peripheral wall 81 corresponds to a shape of the peripheral wall 72 of the first housing member 61.

A bottom 82 (surface located in the upper part in FIG. 4) of the accommodation recess 80 includes a reference seating surface 82a, a convex part 82b, and a concave groove 82c. The reference seating surface 82a forms a planar surface and constitutes an outer peripheral portion of the bottom 82. The reference seating surface 82a is connected to the inner peripheral wall 81 of the accommodation recess 80. That is, an outer peripheral shape of the reference seating surface 82a is a rectangular shape corresponding to the inner peripheral wall 81. An inner peripheral shape of the reference seating surface 82a is a rectangular shape. The reference seating surface 82a is formed in a shape approximating the shape of the window frame 62b constituting the second housing member 62. Accordingly, the inner peripheral shape of the reference seating surface 82a is a rectangular shape approximating the window opening 62a.

The convex part 82b is formed in a portion inside an inner peripheral surface of the reference seating surface 82a near the center of the bottom 82. The convex part 82b protrudes toward the opening (lower part in FIG. 4) of the accommodation recess 80. That is, the convex part 82b protrudes toward the seating surface seat frame 11. In detail, the convex part 82b protrudes further toward the seating surface seat frame 11 side than the reference seating surface 82a. The convex part 82b is located further inside than the inner peripheral surface of the reference seating surface 82a. That is, there is a distance between an outer peripheral surface of the convex part 82b and the inner peripheral surface of the reference seating surface 82a.

In the present embodiment, the convex part 82b is composed of an elastic layer having a single elastic modulus. The convex part 82b is made of the elastic material constituting the seating surface seat cushion 12. That is, the elastic modulus of the convex part 82b is equal to an elastic modulus of the other portions constituting the seating surface seat cushion 12.

The concave groove 82c is formed along a periphery of the convex part 82b. That is, the concave groove 82c constitutes a boundary portion between the reference seating surface 82a and the convex part 82b, and is formed over the entire periphery of the convex part 82b.

Various dimensions of the accommodation recess 80 are described with reference to FIG. 4 and FIG. 5. The opening of the accommodation recess 80 has a width Xb1 and a depth Yb1. An outer shape of the bottom 82 of the accommodation recess 80 also has a width Xb1 and a depth Yb1. A depth of the accommodation recess 80, that is, a height of the inner peripheral wall 81, is Zb1.

The convex part 82b has a width Xb2 and a depth Yb2. A distance from a tip surface (lower surface in FIG. 4) of the convex part 82b to the opening of the accommodation recess 80 is Zb2. A distance between the tip surface of the convex part 82b and the reference seating surface 82a is Zb3. That is, a value obtained by adding Zb2 and Zb3 is Zb1. The concave groove 82c has a groove width W which is the same over the entire length. The inner peripheral shape of the reference seating surface 82a has a width Xb3 and a depth Yb3.

4. Dimensional Relationships Between Sensor Device 3 and Elastic Support Member 4 and Accommodation Recess 80

Next, dimensional relationships between the sensor device 3, the elastic support member 4, and the accommodation recess 80 are described. The dimensional relationships are as shown in the following expressions.

$$Xa1 > Xb1 \quad (1)$$

$$Ya1 > Yb1 \quad (2)$$

$$Za1 + Zc = Zb1 \quad (3)$$

$$Xb2 < Xa2 < Xb3 \quad (4)$$

$$Yb2 < Ya2 < Yb3 \quad (5)$$

$$Za2 + Zc > Zb2 \quad (6)$$

$$Za3 < Zb3 \quad (7)$$

5. Detailed Configuration of Sensor-Equipped Seat 1

Figure 6:
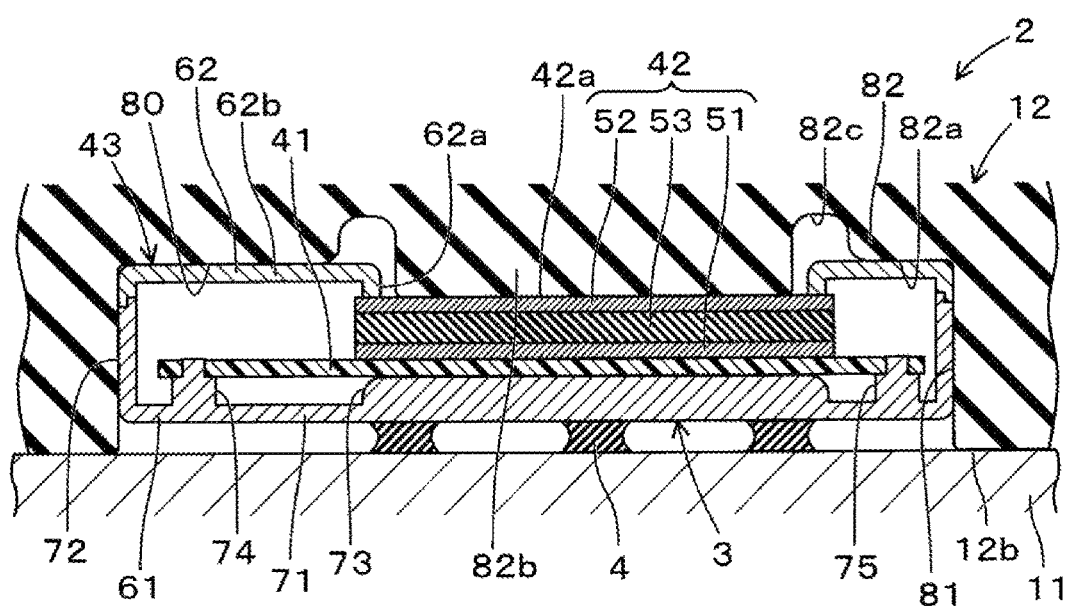
FIG. 6 is a partial cross-sectional view of a portion of a seating surface part that includes the sensor device in the sensor-equipped seat of Embodiment 1.

As a detailed configuration of the sensor-equipped seat 1, an assembled state of the sensor device 3 and the accommodation recess 80 is described with reference to FIG. 6. FIG. 6 shows an initial state in which the seated person is not seated on the seat body 2. Accordingly, the initial state is described below.

The seating surface seat cushion 12 is fixed to the seating surface seat frame 11. Accordingly, an area around the accommodation recess 80 in the opposition pressure receiving surface 12b of the seating surface seat cushion 12 contacts the seating surface seat frame 11 while being slightly pre-compressed with respect to the seating surface seat frame 11.

The sensor device 3 is disposed between the opposite pressure receiving surface 12b of the seating surface seat cushion 12 and the seating surface seat frame 11. Furthermore, the housing 43 of the sensor device 3 is elastically supported by the elastic support member 4 interposed between the seating surface seat frame 11 and the sensor device 3.

Furthermore, the sensor device 3 and the elastic support member 4 are accommodated in the accommodation recess 80 of the seating surface seat cushion 12. The outer peripheral surface of the sensor device 3, that is, the peripheral wall 72 of the first housing member 61, contacts the inner peripheral wall 81 of the accommodation recess 80. The inner peripheral wall 81 of the accommodation recess 80 of the seating surface seat cushion 12 is slightly pre-compressed with respect to the outer peripheral surface of the sensor device 3. Accordingly, the sensor device 3 is positioned in the accommodation recess 80 in a flat direction (left-right and front-rear directions in FIG. 6) of the sensor device 3.

The outer surface of the window frame 62b constituting the second housing member 62 of the sensor device 3 contacts the reference seating surface 82a of the accommodation recess 80. The reference seating surface 82a of the accommodation recess 80 of the seating surface seat cushion 12 is slightly pre-compressed with respect to the window frame 62b of the sensor device 3. In the seating surface seat cushion 12, according to the relationship represented by expression (3) described above, a pre-compression amount with respect to the seating surface seat frame 11 and a pre-compression amount with respect to the window frame 62b of the sensor device 3 are approximately the same. The pre-compression amount here is, for example, approximately based on the dead weight of the seating surface seat cushion 12.

The tip surface of the convex part 82b of the accommodation recess 80 is inserted into the window opening 62a of the sensor device 3 and contacts the detection surface 42a of the sensor body 42. That is, the detection surface 42a of the sensor body 42 receives pressure from the convex part 82b in the seating surface seat cushion 12. The sensor device 3 detects a physical quantity corresponding to the pressure received by the detection surface 42a.

According to the relationships represented by expressions (3), (6), and (7) described above, in the initial state, the convex part 82b is pre-compressed with respect to the detection surface 42a of the sensor body 42. In particular, a pre-compression amount due to the convex part 82b with respect to the detection surface 42a of the sensor body 42 is set sufficiently greater than the pre-compression amount due to the reference seating surface 82a with respect to the window frame 62b (corresponding to an area around the detection surface 42a). The pre-compression amount due to the convex part 82b with respect to the detection surface 42a of the sensor body 42 is set sufficiently greater than the pre-compression amount due to the seating surface seat cushion 12 with respect to the seating surface seat frame 11 (corresponding to the area around the detection surface 42a). Accordingly, in the initial state, the detection surface 42a of the sensor body 42 receives pressure greater than the dead weight of the seating surface seat cushion 12 from the convex part 82b.

According to the relationships represented by expressions (4) and (5) described above, the convex part 82b is disposed with a gap from the inner peripheral surface of the window frame 62b. In particular, the convex part 82b is arranged with a gap from the inner peripheral surface of the window frame 62b over the entire circumference. Accordingly, when the convex part 82b is compressed, a restricting force due to contact with the window frame 62b can be prevented from acting.

Furthermore, the concave groove 82c is formed over the entire boundary between the reference seating surface 82a and the convex part 82b. The concave groove 82c is disposed in non-contact with the sensor device 3. Accordingly, even if the pre-compression amount of the reference seating surface 82a and the pre-compression amount of the convex part 82b are different, a difference in the pre-compression amount can be absorbed by the concave groove 82c. That is, a difference can be reliably made between the pre-compression amount due to the reference seating surface 82a and the pre-compression amount due to the convex part 82b.

6. Operation of Sensor Device 3

Examples of a target to be detected by the sensor device 3 include the seating state of the seated person, such as a change in the seating posture. Since a deformation state of the seating surface seat cushion 12 changes due to a change in the seating posture of the seated person, the sensor body 42 receives pressure transmitted via the seating surface seat cushion 12. Specifically, due to a change in the seating posture, a change occurs in the pressure received by the sensor body 42 from the convex part 82b of the seating surface seat cushion 12. That is, the sensor body 42 outputs a physical quantity corresponding to the changed pressure. The sensor device 3 detects a change in the seating posture of the seated person based on the physical quantity output by the sensor body 42.

Other examples of the target to be detected by the sensor device 3 include the biological information such as breathing, pulsation, or heartbeat of the seated person. Due to breathing, pulsation, or heartbeat, minute vibration occurs in a skin surface of the seated person. Due to the minute vibration, the sensor body 42 receives pressure transmitted via the seating surface seat cushion 12. Specifically, due to the minute vibration, a change occurs in the pressure received by the sensor body 42 from the convex part 82b of the seating surface seat cushion 12. That is, the sensor body 42 outputs a physical quantity corresponding to the changed pressure. The sensor device 3 detects the biological information of the seated person based on the physical quantity output by the sensor body 42.

7. Effects of Arrangement of Sensor Device 3

As described above, the sensor device 3 includes the housing 43, and the sensor body 42 is accommodated in the housing 43. Accordingly, the sensor body 42 accommodated in the housing 43 can be stably positioned within the housing 43.

The sensor device 3 is disposed between the seating surface seat frame 11 and the opposite pressure receiving surface 12b of the seating surface seat cushion 12. The housing 43 of the sensor device 3 includes the window frame 62b for forming the window opening 62a, and the detection surface 42a of the sensor body 42 is exposed at the window opening 62a. By the detection surface 42a of the sensor body 42 receiving pressure from the opposite pressure receiving surface 12b of the seating surface seat cushion 12, the sensor device 3 detects the seating state or biological information of the seated person.

However, when vibration of the seating surface seat frame 11 is transmitted to the sensor body 42 via the housing 43, there is a possibility that a detection result of the sensor body 42 may include noise, and detection cannot be performed with high accuracy. Accordingly, the housing 43 of the sensor device 3 is elastically supported by the seating surface seat frame 11 via the elastic support member 4. Accordingly, the vibration of the seating surface seat frame 11 can be prevented from being directly transmitted to the housing 43 of the sensor device 3, and the sensor body 42 can be prevented from being affected by the vibration of the seating surface seat frame 11.

In particular, the elastic modulus of the elastic support member 4 is set equal to or greater than the elastic modulus of the seating surface seat cushion 12. Accordingly, by the elastic support member 4, while the vibration from the seating surface seat frame 11 can be prevented from being transmitted to the housing 43 of the sensor device 3, the detection surface 42a of the sensor body 42 is able to reliably receive pressure from the seated person via the seating surface seat cushion 12. Accordingly, the seating state or biological information of the seated person can be detected with high accuracy.

8. Vibration Properties in Spring-Mass Model

The sensor device 3 and the elastic support member 4 constitute a first spring-mass model M1 in which the elastic support member 4 is a spring body and the sensor device 3 is a mass body. The seated person and the seating surface seat cushion 12 constitute a second spring-mass model M2 in which the seating surface seat cushion 12 is a spring body and the seated person is a mass body.

Figure 7:
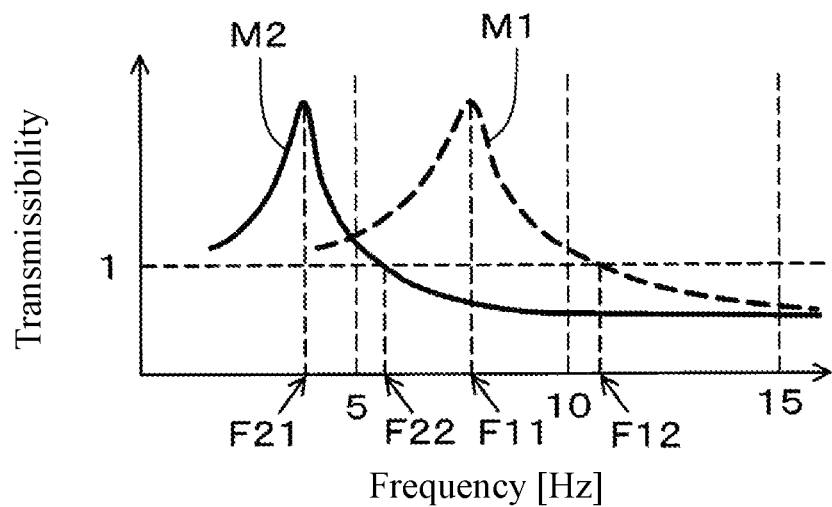
FIG. 7 shows a vibration property of a first spring-mass model and a second spring-mass model.

Vibration properties of each of the first spring-mass model M1 and the second spring-mass model M2 are described with reference to FIG. 7. The first spring-mass model M1 has, as the vibration properties, a first resonant frequency F11, and a first anti-vibration region boundary frequency F12 at which transmissibility becomes 1. The second spring-mass model M2 has, as the vibration properties, a second resonant frequency F21, and a second anti-vibration region boundary frequency F22 at which the transmissibility becomes 1. The first resonant frequency F11 is set to a value greater than the second resonant frequency F21. The first anti-vibration region boundary frequency F12 is set to a value greater than the second anti-vibration region boundary frequency F22.

For example, the first anti-vibration region boundary frequency F12 is set to be 5 Hz or higher. In particular, the first resonant frequency F11 is set between 5 Hz and 10 Hz, and the first anti-vibration region boundary frequency F12 is set between 8 Hz and 15 Hz. Accordingly, in the case where the seating surface seat frame 11 vibrates due to disturbance, vibration in a frequency band in which a vibration frequency of the seating surface seat frame 11 is equal to or greater than the first anti-vibration region boundary frequency F12 can be prevented from being transmitted to the sensor device 3.

The second resonant frequency F21 is set between 2 Hz and 6 Hz, and the second anti-vibration region boundary frequency F22 is set between 5 Hz and 10 Hz. Accordingly, in the case where the seating surface seat frame 11 vibrates due to disturbance, vibration in a frequency band in which the vibration frequency of the seating surface seat frame 11 is equal to or greater than the second anti-vibration region boundary frequency F22 can be prevented from being transmitted to the seated person.

Here, as described above, the first anti-vibration region boundary frequency F12 is set to a value greater than the second anti-vibration region boundary frequency F22. Accordingly, if vibration applied from the seated person to the seating surface seat cushion 12 is included within a frequency band equal to or less than the first anti-vibration region boundary frequency F12 and within a frequency band equal to or less than the second anti-vibration region boundary frequency F22, the vibration is transmitted to the sensor device 3. For example, since the human pulse is approximately 1 Hz to 3 Hz, the pulse is transmitted from the seated person to the sensor device 3 via the seating surface seat cushion 12. At this time, the elastic support member 4 does not reduce the transmission of the vibration of the pulse.

In order to achieve the vibration properties of the first spring-mass model M1 described above, the elastic modulus of the elastic support member 4 and the mass of the sensor device 3 are set. In order to achieve the vibration properties of the second spring-mass model M2 described above, the elastic modulus of the seating surface seat cushion 12 is set. In estimation of the vibration properties of the second spring-mass model M2, for the mass of the seated person, that is, the weight, an average weight (for example, 60 kg) or a predetermined range (for example, a range of 45 kg to 100 kg) is used.

9. Effects of Pre-Compression of Convex Part 82b

Effects of the sensor device 3 in the sensor-equipped seat 1 are described. As described above, in the initial state in which the seated person is not seated on the seat body 2, in the seating surface seat cushion 12, the pre-compression amount with respect to the detection surface 42a of the sensor body 42 is set greater than the pre-compression amount with respect to the area (reference seating surface 82a and seating surface seat frame 11) around the detection surface 42a.

Accordingly, in the initial state, a stress larger than that in other portions has already occurred in the convex part 82b in the seating surface seat cushion 12. The convex part 82b is pre-compressed in a normal direction of the detection surface 42a of the sensor body 42. Accordingly, in the seating surface seat cushion 12, the largest stress occurs in the convex part 82b. A stress larger than that in other portions occurs in a range from the convex part 82b to the pressure receiving surface 12a of the seating surface seat cushion 12. Hence, the sensor body 42 has already received pressure from the convex part 82b in the initial state.

Subsequently, a case is considered where the seated person is seated on the seat body 2. Since the seated person is seated on the seat body 2, force is applied from the buttocks of the seated person to the seating surface seat cushion 12. Then, the seating surface seat cushion 12 deforms according to the buttocks and weight of the seated person. In the seating state, the magnitude of the stress occurring in the seating surface seat cushion 12 changes compared to the initial state. However, even in the seating state, in the seating surface seat cushion 12, the largest stress occurs in the convex part 82b, and a stress larger than that in other portions occurs in the range from the convex part 82b to the pressure receiving surface 12a of the seating surface seat cushion 12.

Here, one of the examples of the target to be detected by the sensor device 3 is the seating state of the seated person, such as a change in the seating posture. Other examples of the target to be detected by the sensor device 3 include the biological information such as breathing, pulsation, or heartbeat of the seated person.

By the detection surface 42a of the sensor body 42 receiving pressure from the convex part 82b of the opposite pressure receiving surface 12b of the seating surface seat cushion 12, the sensor device 3 detects the seating state or biological information of the seated person. However, the seating surface seat cushion 12 absorbs the force applied from the seated person. Hence, even if force is applied to the pressure receiving surface 12a of the seating surface seat cushion 12 due to a change in the seating state of the seated person or vibration generated by a living body, if the seating surface seat cushion 12 absorbs everything, the sensor device 3 may not be able to detect the seating state or biological information of the seated person.

However, as described above, the detection surface 42a of the sensor body 42 is pre-compressed by the seating surface seat cushion 12 in the initial state. In the initial state, the seating surface seat cushion 12 also applies pre-compression to the area (reference seating surface 82a and seating surface seat frame 11) around the detection surface 42a of the sensor body 42. In the initial state, in the seating surface seat cushion 12, the pre-compression amount with respect to the detection surface 42a of the sensor body 42 is set greater than the pre-compression amount with respect to the area around the detection surface 42a.

In this way, by setting the pre-compression amount with respect to the detection surface 42a of the sensor body 42 to be greater than the surrounding area, even if the force applied from the seated person to the seating surface seat cushion 12 when the seated person is seated on the seat body 2 is extremely small, said force is transmitted to the detection surface 42a of the sensor body 42. Accordingly, the detection surface 42a of the sensor body 42 is able to detect a minute change in the pressure applied to the seating surface seat cushion 12.

That is, even if there is only a very slight change in the seating state of the seated person, the detection surface 42a of the sensor body 42 is able to detect a minute change in the pressure transmitted along with said change. Accordingly, the seating state of the seated person can be detected with high accuracy. The force applied from the seated person to the seating surface seat cushion 12 due to vibration generated by a living body, such as breathing, pulsation, and heartbeat, is small in magnitude. Even in such a case, the detection surface 42a of the sensor body 42 is able to detect a minute change in the pressure transmitted along with said vibration generated by the living body. Accordingly, the biological information of the seated person can be detected with high accuracy.

In particular, as described above, in the initial state, in the seating surface seat cushion 12, the largest stress occurs in the convex part 82b, and a stress larger than that in other portions occurs in the range from the convex part 82b to the pressure receiving surface 12a of the seating surface seat cushion 12. Hence, a region where the stress occurs in the initial state has higher force transmission sensitivity than other regions.

Accordingly, even if the force applied to the pressure receiving surface 12a of the seating surface seat cushion 12 is small, the small force is transmitted with high sensitivity in a range from the pressure receiving surface 12a of the seating surface seat cushion 12 to the detection surface 42a of the sensor body 42 via the convex part 82b. As a result, the seating state or biological information of the seated person can be detected with high accuracy.

As described above, the convex part 82b is disposed with a gap from the inner peripheral surface of the window frame 62b. Hence, the convex part 82b is able to apply pre-compression in the normal direction of the detection surface 42a of the sensor body 42. That is, in the initial state, a desired stress distribution can be achieved in the seating surface seat cushion 12. Furthermore, the force received by the seating surface seat cushion 12 can be reliably transmitted to the detection surface 42a of the sensor body 42. As a result, the seating state or biological information of the seated person can be detected with high accuracy.

In particular, the elastic modulus of the elastic support member 4 is set equal to or greater than the elastic modulus of the seating surface seat cushion 12. Accordingly, in the initial state in which the seated person is not seated on the seat body 2, in the seating surface seat cushion 12, the pre-compression amount with respect to the detection surface 42a of the sensor body 42 can be set greater than the pre-compression amount with respect to the area (reference seating surface 82a and seating surface seat frame 11) around the detection surface 42a.

Embodiment 2

Figure 8:
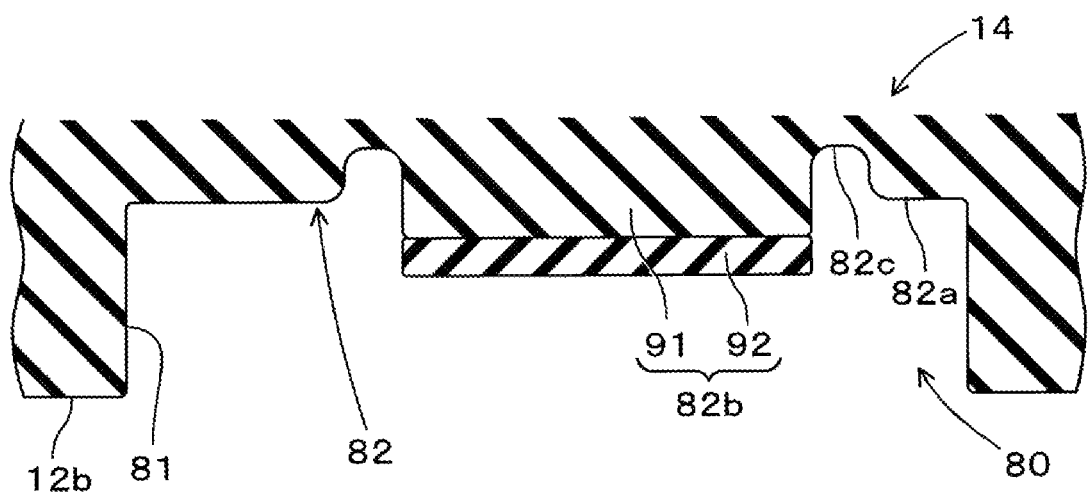
FIG. 8 is a partial cross-sectional view of a seating surface seat cushion that constitutes a sensor-equipped seat of Embodiment 2.
Figure 9:
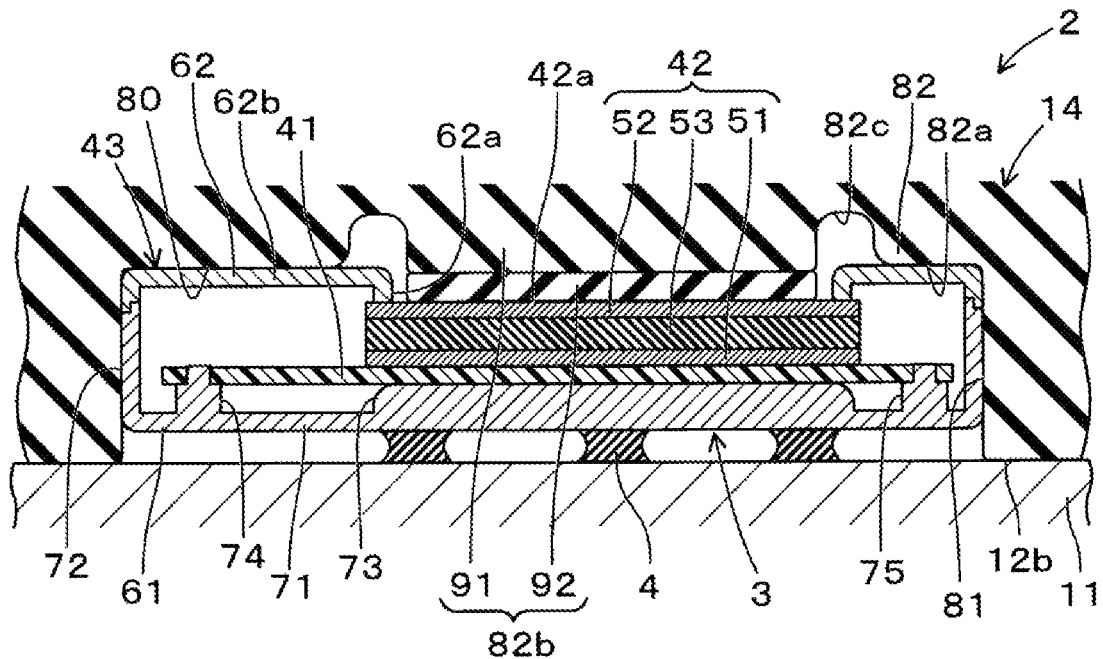
FIG. 9 is a partial cross-sectional view of a portion of a seating surface part that includes the sensor device in the sensor-equipped seat of Embodiment 2.

In the sensor-equipped seat 1 of Embodiment 1, the convex part 82b of the seating surface seat cushion 12 is composed of an elastic layer having a single elastic modulus. As shown in FIG. 8 and FIG. 9, in the sensor-equipped seat 1 of Embodiment 2, the convex part 82b of a seating surface seat cushion 14 is configured to include a first elastic layer 91 and a second elastic layer 92.

The first elastic layer 91 and the second elastic layer 92 are laminated in a protrusion direction of the convex part 82b, that is, the normal direction of the detection surface 42a of the sensor body 42. The first elastic layer 91 and the second elastic layer 92 may or may not be joined. Furthermore, the first elastic layer 91 and the second elastic layer 92 have different elastic moduli. That is, the first elastic layer 91 and the second elastic layer 92 are made of different elastic materials.

In this way, since the convex part 82b is composed of the first elastic layer 91 and the second elastic layer 92 having different elastic moduli, the pressure transmission sensitivity in the convex part 82b can be adjusted. An example has been given above in which two layers have different elastic moduli. However, the number of layers can be three or more.

Embodiment 3

Figure 10:
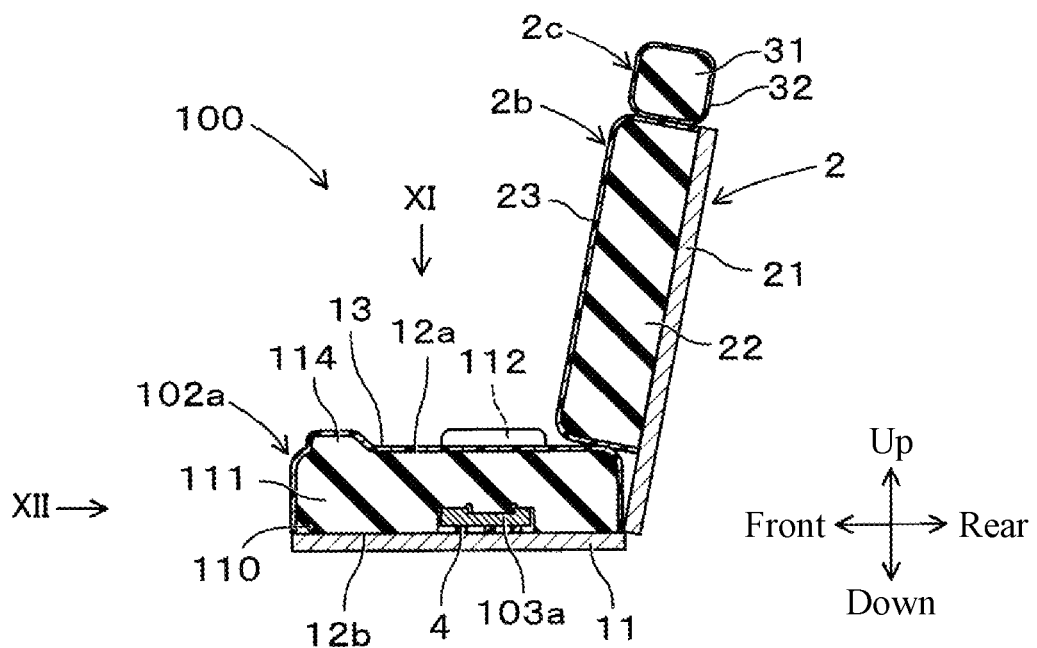
FIG. 10 is a cross-sectional view of a sensor-equipped seat of Embodiment 3.
Figure 11:
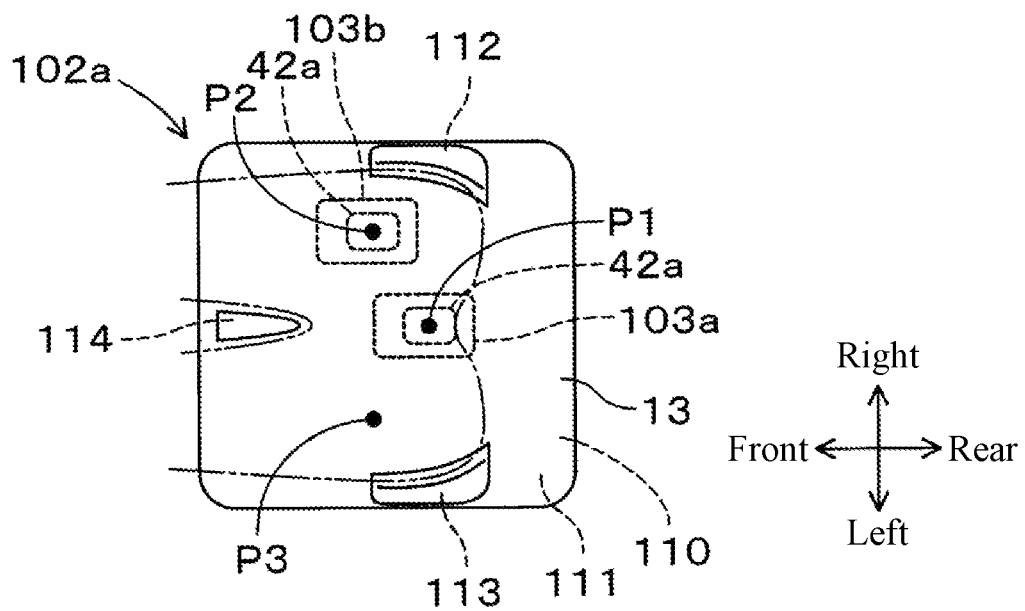
FIG. 11 shows only a seat seating surface part of the sensor-equipped seat of Embodiment 3 as viewed in direction XI in FIG. 10.
Figure 12:
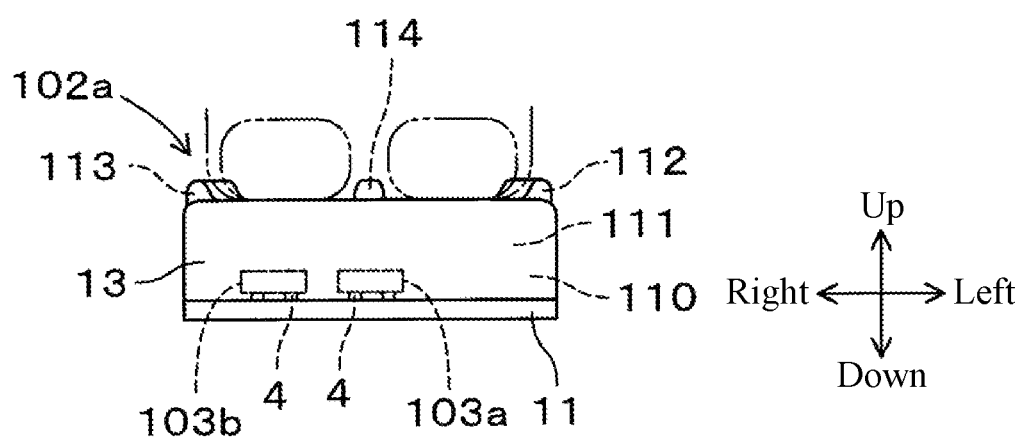
FIG. 12 shows only the seat seating surface part of the sensor-equipped seat of Embodiment 3 as viewed in direction XII in FIG. 10.

A sensor-equipped seat 100 according to Embodiment 3 is described with reference to FIG. 10 to FIG. 12. In FIG. 11, the chain double-dashed line indicates the buttocks and a portion of the lower limb of the seated person. The sensor-equipped seat 100 of Embodiment 3 includes, as a seat seating surface part 102a, the seating surface seat frame 11, a seating surface seat cushion 110, and the seat surface skin member 13. Like the sensor-equipped seat 1 of Embodiment 1, in the sensor-equipped seat 100 of the present embodiment, sensor devices 103a and 103b are disposed between the seating surface seat frame 11 and the seating surface seat cushion 110 that constitute the seat seating surface part 102a of the seat body 2. Furthermore, the housing 43 of the sensor devices 103a and 103b is elastically supported by the elastic support member 4 interposed between the seating surface seat frame 11 and the sensor devices 103a and 103b.

The seating surface seat cushion 110 includes a seating surface seat cushion body 111, a pair of buttock supports 112 and 113, and an inter-thigh support 114. The seating surface seat cushion 110 is covered with the seating surface skin member 13. The seating surface seat cushion body 111 constitutes a portion for carrying the buttocks of the seated person. The seating surface seat cushion body 111 also carries a portion of the thigh of the seated person.

The pair of buttock supports 112 and 113 bulge upward from both ends of the seating surface seat cushion body 111 in the left-right direction. The pair of buttock supports 112 and 113 constitute a portion for positioning the buttocks of the seated person in the left-right direction. In detail, the pair of buttock supports 112 and 113 are provided at both ends of the seating surface seat cushion body 111 in the left-right direction and to the rear of the center of the seating surface seat cushion body 111 in the front-rear direction. The pair of buttock supports 112 and 113 have a curved concave surface following a surface shape extending rearward from side surfaces of the buttocks. Accordingly, the pair of buttock supports 112 and 113 are able to support the buttocks of the seated person surface-to-surface over a wide range.

However, the pair of buttock supports 112 and 113 may also be of a shape that does not correspond to the surface shape of the buttocks, such as, for example, a columnar shape, a truncated cone shape, an elliptical cylinder shape, a truncated elliptic cone shape, a prism shape, or a truncated pyramid shape. In the seating surface seat cushion body 111, the pair of buttock supports 112 and 113 may not only be provided at the rear in the front-rear direction, but may be provided in a long range in the front-rear direction. For example, the pair of buttock supports 112 and 113 may be provided over the entire length of the seating surface seat cushion body 111 in the front-rear direction.

The inter-thigh support 114 bulges upward from a central part in the left-right direction at the front of the seating surface seat cushion body. Since the inter-thigh support 114 is located between the left and right thighs of the seated person, the inter-thigh support 114 constitutes a portion for positioning the left and right thighs of the seated person in the left-right direction and the front-rear direction.

The inter-thigh support 114 is, for example, formed to decrease in left-right width rearward. That is, the inter-thigh support 114 is formed in a triangular shape having a rear apex as viewed from above the seating surface seat cushion body 111.

The pair of buttock supports 112 and 113 and the inter-thigh support 114 have an elastic modulus set greater than an elastic modulus of the seating surface seat cushion body 111. Accordingly, the pair of buttock supports 112 and 113 and the inter-thigh support 114 effectively exhibit the function of positioning the buttocks of the seated person.

The sensor devices 103a and 103b are configured in the same manner as the sensor device 3 described in Embodiment 1. The sensor device 103a is disposed near the center in the left-right direction, close to the rear in the front-rear direction and between the seating surface seat cushion body 111 and the seating surface seat frame 11. As viewed from above the seating surface seat cushion body 111, at least a portion of the sensor device 103a in the front-rear direction is located in a facing region between the pair of buttock supports 112 and 113 in the left-right direction. In particular, as viewed from above the seating surface seat cushion body 111, at least a portion of the detection surface 42a constituting the sensor device 103a is located in the facing region between the pair of buttock supports 112 and 113 in the left-right direction.

In FIG. 11, the entire sensor device 103a in the front-rear direction is located in the facing region between the pair of buttock supports 112 and 113 in the left-right direction. Accordingly, the entire detection surface 42a constituting the sensor device 103a is located in the facing region between the pair of buttock supports 112 and 113 in the left-right direction.

Furthermore, in the case where the buttocks of the seated person are positioned by the pair of buttock supports 112 and 113 and the inter-thigh support 114, the sensor device 103a is set to be located below sacrum P1 of the seated person. In particular, the detection surface 42a constituting the sensor device 103a is set to be located below the sacrum P1 of the seated person.

The sensor device 103b is disposed close to the right side in the left-right direction, near the center in the front-rear direction and between the seating surface seat cushion body 111 and the seating surface seat frame 11. As viewed from above the seating surface seat cushion body 111, at least a portion of the sensor device 103b in the front-rear direction is located in the facing region between the pair of buttock supports 112 and 113 in the left-right direction. In particular, as viewed from above the seating surface seat cushion body 111, at least a portion of the detection surface 42a constituting the sensor device 103b is located in the facing region between the pair of buttock supports 112 and 113 in the left-right direction.

Furthermore, in the case where the buttocks of the seated person are positioned by the pair of buttock supports 112 and 113 and the inter-thigh support 114, the sensor device 103b is set to be located below an ischial bone P2 on the right side of the seated person. In particular, the detection surface 42a constituting the sensor device 103b is set to be located below the ischial bone P2 of the seated person.

Since the seating surface seat cushion 110 includes the pair of buttock supports 112 and 113 and the inter-thigh support 114, the buttocks of the seated person can be positioned at a desired position. In particular, the sensor device 103a can be located below the sacrum P1 of the seated person, and the sensor device 103b can be located below the ischial bone P2 of the seated person.

Force applied to the seating surface seat cushion 110 from, of the buttocks of the seated person, the sacrum P1 or ischial bones P2 and P3 of the seated person, increases. Accordingly, since the sensor device 103a is located below the sacrum P1, the sensor device 103a is able to detect, with high accuracy, a minute change in the pressure applied from the seated person. Since the sensor device 103a is located below the ischial bone P2, the sensor device 103b is able to detect, with high accuracy, a minute change in the pressure applied from the seated person.

In Embodiment 3, the sensor devices 103a and 103b are provided. However, there may be provided only the sensor device 103a or only the sensor device 103b. The sensor devices 103a and 103b may be provided below the ischial bones P2 and P3 on the left and right, respectively.

The case including the pair of buttock supports 112, 113 and the inter-thigh support 114 has been described as an example. However, a configuration is possible which includes the pair of buttock supports 112 and 113 but does not include the inter-thigh support 114. A configuration is possible which does not include the pair of buttock supports 112 and 113 but includes the inter-thigh support 114.

Other Embodiments

In the above embodiments, the sensor device 3 and the elastic support member 4 may be accommodated in the accommodation recess 80 of the seating surface seat cushion 12. In addition, an accommodation recess may be formed in the seating surface seat frame 11, and the sensor device 3 and the elastic support member 4 may be accommodated in the accommodation recess. In this case, the seating surface seat cushion 12 does not include the accommodation recess 80, but only includes a portion corresponding to the bottom 82 of the accommodation recess 80.

The outer shape of the sensor device 3 and the shape of the inner peripheral wall 81 of the accommodation recess 80 may be any shape if they correspond to each other. The shape (shape of the inner peripheral surface of the window frame 62b) of the window opening 62a of the sensor device 3 and the shape of the outer peripheral surface of the convex part 82b may be any shape if they correspond to each other.

What is claimed is:

1. A sensor-equipped seat (1, 100), comprising:
   a seat body (2), comprising a seat frame (11) and a seat cushion (12, 14, 110) that is attached to the seat frame;
   a sensor device (3, 103a, 103b), disposed between the seat frame and an opposite pressure receiving surface (12b) that is located on a back side of a pressure receiving surface (12a) receiving pressure from a seated person in the seat cushion, the sensor device detecting a physical quantity corresponding to pressure transmitted via the seat cushion from the pressure receiving surface of the seat cushion in a seating state by the seated person, thereby detecting the seating state of the seated person or biological information of the seated person; and
   an elastic support member (4), interposed between the seat frame and the sensor device, and elastically supporting the sensor device, wherein
   the sensor device comprises:
      a sensor body (42), comprising a detection surface (42a) receiving pressure from the opposite pressure receiving surface of the seat cushion; and
      a housing (43), accommodating the sensor body, comprising a window frame (62b) for forming a window opening (62a), exposing the detection surface of the sensor body at the window opening, and supported by the elastic support member; and
   the elastic support member has an elastic modulus set equal to or greater than an elastic modulus of the seat cushion.

2. The sensor-equipped seat (1, 100) according to claim 1, wherein
   a first anti-vibration region boundary frequency (F12) at which transmissibility becomes 1 or less in a first spring-mass model (M1) in which the elastic support member is a spring body and the sensor device is a mass body is set to a value greater than a second anti-vibration region boundary frequency (F22) at which transmissibility becomes 1 or less in a second spring-mass model (M2) in which the seat cushion is a spring body and the seated person is a mass body.

3. The sensor-equipped seat (1, 100) according to claim 1, wherein
   the elastic modulus of the elastic support member and mass of the sensor device are set so that a first anti-vibration region boundary frequency (F12) at which transmissibility becomes 1 or less in a first spring-mass model (M1) in which the elastic support member is a spring body and the sensor device is a mass body becomes 5 Hz or higher.

4. The sensor-equipped seat (1, 100) according to claim 1, wherein,
   in an initial state in which the seated person is not seated on the seat body, a pre-compression amount of the seat cushion with respect to the detection surface is set greater than a pre-compression amount of the seat cushion with respect to the window frame.

5. The sensor-equipped seat (1, 100) according to claim 4, wherein
   the seat cushion comprises a convex part (82b) that is formed on the opposite pressure receiving surface, protrudes toward the seat frame and is pre-compressed in contact with the detection surface in the initial state; and
   the detection surface receives pressure from the convex part.

6. The sensor-equipped seat (1, 100) according to claim 5, wherein
the convex part is disposed with a gap from an inner peripheral surface of the window frame.

7. The sensor-equipped seat (1, 100) according to claim 5, wherein
the seat cushion comprises:
the convex part, contacting the detection surface; and
a reference seating surface (82*a*), formed on the opposite pressure receiving surface, formed around the convex part, and contacting the window frame.

8. The sensor-equipped seat (1, 100) according to claim 7, wherein
the seat cushion further comprises:
a concave groove (82*c*), formed in the opposite pressure receiving surface, formed at a boundary between the convex part and the reference seating surface, formed along a periphery of the convex part, and disposed in non-contact with the sensor device.

9. The sensor-equipped seat (1, 100) according to claim 5, wherein
the seat cushion comprises an accommodation recess (80) that is formed in the opposite pressure receiving surface, accommodates the sensor device, and opens on the seat frame side; and
a bottom of the accommodation recess comprises the convex part.

10. The sensor-equipped seat (1, 100) according to claim 9, wherein
an inner peripheral wall (81) of the accommodation recess is in contact with a peripheral surface of the housing of the sensor device.

11. The sensor-equipped seat (100) according to claim 1, wherein
the sensor device is disposed between the seat frame and the seat cushion that constitute a seat seating surface part of the seat body;
the seat cushion comprises:
a seat cushion body (111), for carrying buttocks of the seated person; and
a pair of buttock supports (112, 113), bulging upward from both ends of the seat cushion body in a left-right direction and for positioning the buttocks of the seated person in the left-right direction.

12. The sensor-equipped seat (100) according to claim 11, wherein,
as viewed from above the seat cushion body, at least a portion of the sensor device in a front-rear direction is located in a facing region between the pair of buttock supports (112, 113) in the left-right direction.

13. The sensor-equipped seat (100) according to claim 11, wherein
the pair of buttock supports have an elastic modulus set greater than an elastic modulus of the seat cushion body.

14. The sensor-equipped seat (100) according to claim 11, wherein
the seat cushion further comprises an inter-thigh support (114) that bulges upward from a central part in the left-right direction at the front of the seat cushion body and is for positioning left and right thighs of the seated person in the left-right direction and a front-rear direction.

15. The sensor-equipped seat (100) according to claim 14, wherein
the inter-thigh support has an elastic modulus set greater than an elastic modulus of the seat cushion body.

16. The sensor-equipped seat (100) according to claim 11, wherein
the sensor device is located below at least one of ischial bone (P2) and sacrum (P1) of the seated person.

* * * * *